United States Patent [19]
Charcharos

[11] 3,775,248
[45] Nov. 27, 1973

[54] NUCLEAR REACTOR BOILER SYSTEM
[75] Inventor: Anthreas Nicholas Charcharos, Lutterworth, England
[73] Assignee: British Nuclear Design & Construction Limited, Leicester, England
[22] Filed: Feb. 24, 1972
[21] Appl. No.: 228,804

[30] Foreign Application Priority Data
Feb. 25, 1971 Great Britain .................... 5,422/71

[52] U.S. Cl. .......................... 176/65, 176/60, 122/32
[51] Int. Cl. ........................ G21c 15/00, F22b 21/00
[58] Field of Search .................. 176/65, 60, 38, 87, 176/55, 56; 122/32, 34

[56] References Cited
UNITED STATES PATENTS
3,357,892  12/1967  Schmidt ............................... 176/65
3,438,357  4/1969  Weber ................................. 122/32
3,544,425  12/1970  Shaw et al. .......................... 176/87

FOREIGN PATENTS OR APPLICATIONS
903,012  8/1962  Great Britain ...................... 122/32
1,520,447  3/1968  France ............................... 176/65

Primary Examiner—Harvey E. Behrend
Attorney—Roberts B. Larson et al.

[57] ABSTRACT

In a nuclear reactor in which coolant flow through the reactor core is downward, the boiler system to which the heated coolant is fed is arranged so that, although the coolant flow through the boiler system is generally upward, it is nevertheless downward in those parts of the boiler system which contain water in the liquid phase; and the flow of water through those parts is arranged to be upward, thereby alleviating the problems of instability and thermal shock which are associated with downward water flow particularly at low flow rates.

4 Claims, 1 Drawing Figure

PATENTED NOV 27 1973 3,775,248
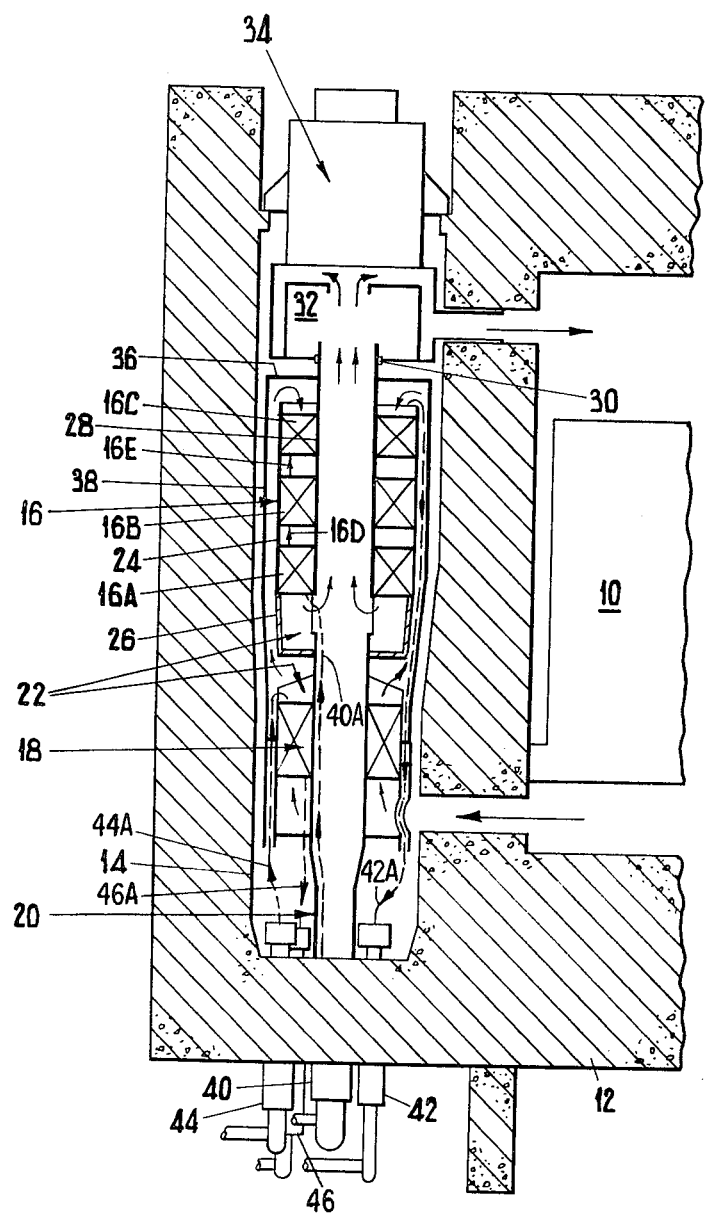

NUCLEAR REACTOR BOILER SYSTEM

This invention relates to nuclear reactor boiler systems.

According to the invention there is provided a nuclear reactor comprising a reactor core, at least one boiler system which includes at least an evaporator section having a water inlet and a stem outlet, and circulator means arranged to drive reactor coolant downwardly through the reactor core, the boiler system being connected to receive at its lower end the reactor coolant which leaves the core and to return such coolant to the circulator means, wherein the said water inlet and steam outlet are disposed at the lower and upper ends respectively of the evaporator section and the boiler system includes duct means arranged to guide coolant received from the reactor core downwardly through the evaporator section.

In one preferred embodiment of the invention the evaporator section is annular and the boiler system also comprises an annular economiser section disposed below the evaporator section and having its upper end connected to the water inlet thereof, an annular superheater section disposed above the evaporator section and having its lower end connected to the steam outlet thereof, a reactor coolant outlet duct extending downwardly through the superheater, evaporator and economiser sections and open at its lower end to the lower end of the economiser section, an upwardly open first casing surrounding the superheater, evaporator and economiser sections and sealed at its lower end to the outlet duct, and an outer casing sealed at its upper end to the outlet duct and surrounding the first casing and forming therewith an annular duct communicating at its upper end with the upper end of the superheater section, the outer casing being open at its lower end to receive the reactor coolant leaving the core.

The boiler sections may be supported on brackets carried by a vertical cylindrical spine which passes through some or all of the sections, Such a preferred embodiment of the invention will now be described with reference to the accompanying drawing which is a fragmentary sectional elevation of a boiler system together with part of the nuclear reactor in which it is incorporated.

Referring to the drawing, the reactor includes a core 10 disposed within a concrete pressure vessel 12. Defined within the wall thickness of the pressure vessel 12 are a number of cylindrical cavities or pods 14 (only one shown) each of which contains a boiler system in accordance with the present invention.

Each boiler system includes a boiler 16 and a reheater 18. The boiler 16 comprises an economizer section 16A, an evaporator section 16B and a superheater section 16C. The evaporator section 16B has at its lower end a water inlet 16D which is connected to the upper end of the economizer section 16A, and at its upper end the evaporator section 16B has a steam outlet 16E which is connected to the lower end of the superheater section 16C. Both the boiler sections 16A, 16B and 16C and the reheater 18 are annular in form and a vertical cylindrical spine 20 extends upwardly through the reheater 18 from the floor of the pod 14. Two sets of brackets 22 extend radially from the spine 20, the upper set of brackets 22 supporting the boiler 16 and the lower set supporting the reheater 18.

A cylindrical casing 24 surrounds the boiler 16; the boiler casing 24 is open at its upper end but at its lower end is sealed to the top of the spine 20 by a frusto conical casing 26. Disposed within the boiler 16 is an outlet gas duct 28 which at its upper end is joined by a seal 30 to the inlet plenum 32 of a gas circulator 34. The outlet duct 28 is welded to and supported by a headplate 36. The headplate 36 is supported upon an outer boiler casing 38 which extends downwardly around both the boiler 16 and the reheater 18 and whose weight is transferred via the lower set of brackets 22 to the spine 20.

The floor of the pod 14 is penetrated by a central water feed 40, four superheater outlets 42 (only one shown), two reheater inlets 44 (only one shown), and two reheater outlets (only one shown). The feed 40 is connected to the boiler inlet (i.e. the lower end of the economizer section 16A) by pipework 40A (shown in broken line) disposed within the spine 20. Pipework 42A (also shown in broken line) passes from the top of the superheater section 16C, via the annular duct defined between the boiler casing 24 and the outer boiler casing 38, to the superheater outlets 42. Further pipework 44 and 46A, respectively, shown in broken line and disposed outside the spine 20, connects the reheater 18 to the reheater inlets 44 and the reheater outlets 46.

In operation of the reactor the gas circulator 34 draws gas from the plenum 32 and forces it downwardly through the core whence it flows to the bottom of the pod 14. As shown by arrows in the drawing the gas flows upwardly through the reheater 18 and then by-passes the boiler 16 by continuing upwardly through the annulus defined between the boiler casing 24 and the outer boiler casing 38. In passing through the annulus the gas transfers heat to superheater outlet pipes 42A disposed therein. The direction of gas flow is reversed by the headplate 36 so that, the gas then flows downwardly through successively the superheater, evaporator and economizer sections of the boiler. From the bottom of the boiler the gas is deflected by the frusto conical casing 26 into the duct 28 via which it returns to the plenum 32.

As will be understood, the boiler sections 16A, 16B and 16C are all of well-known type and are accordingly represented only conventionally in the drawing, each comprising a plurality of spaced apart tubes through each of which water from the inlet 40 (or steam produced from this water) flows upwardly from the lower inlet end to the upper outlet end of the respective section, and around and between which tubes the hot reactor coolant gas flows downwardly, as described above. The reheater 18 similarly is of known kind, comprising a plurality of steam tubes through each of which steam from the reheater inlet 44 flows downwardly from the upper to the lower end of the reheater and thence to the reheater outlet 46, while the hot reactor coolant gas flows upwardly, as described above, around and between these tubes.

It will be seen that by constructing a boiler system in accordance with the present invention it is possible to provide upward water flow through those parts of the boiler system in which the water is in the liquid phase. Thus the problems of instability and thermal shock associated with downward water flow, particularly at low flow rates, can be alleviated. Moreover the present invention achieves upward water flow without unduly complicating the flow of reactor coolant through the boiler system.

I claim:

1. A nuclear reactor comprising a reactor core, a thick-walled pressure vessel enclosing the core and formed within its wall thickness with a vertically extending elongate cavity and with an upper transverse duct extending between the cavity near the upper end thereof and the interior of the vessel and with a lower transverse duct extending between the cavity near the lower end thereof and the interior of the vessel, circulator means for circulation of reactor coolant from the upper end of the cavity through the upper transverse duct to the interior of the vessel and thence downwardly through the core to the lower transverse duct and therethrough to the lower end of the cavity, and a boiler system disposed in the cavity and arranged to receive and discharge such coolant near the lower and upper ends of the cavity respectively, the boiler system comprising a central outlet duct disposed axially of the cavity and connected at its upper end to the circulating means, an annular boiler, comprising at least an evaporator section, surrounding the outlet duct, a boiler casing surrounding the boiler, said boiler casing being open at its upper end but closed at its lower end to provide an enclosed coolant path from the lower end of the boiler to the lower end of the outlet duct, and an outer casing surrounding the said boiler casing and defining therewith an annular duct communicating at its upper end with the said open upper end of the boiler casing, the outer casing being sealed at its upper end to the outlet duct and being open at its lower end to receive said coolant from the lower transverse duct, whereby coolant from the lower transverse duct passes upwardly through the said annular duct, then downwardly through the boiler within the boiler casing, and then upwardly through the outlet duct to the circulator means, the boiler being provided at its lower and upper ends respectively with a water inlet and with a steam outlet for passage of water/steam through the boiler in heat-exchanging relationship with the reactor coolant passing therethrough.

2. A nuclear reactor as claimed in claim 1, wherein the boiler comprises an economiser section disposed below the said boiler section and a superheater section disposed above the said boiler section, the economiser and superheater sections each being annular and surrounding the outlet duct and being surrounded by the boiler casing, the said water inlet being provided at the lower end of the economiser section and the steam outler being provided at the upper end of the superheater section, the lower and upper ends of the boiler section being connected by a water feed connection to the upper end of the economiser section and, respectively, by a steam feed connection to the lower end of the superheater section.

3. A nuclear reactor as claimed in claim 2, wherein a steam reheater, provided with steam inlet and outlet connections, is provided within the lower part of the said outer casing, below the boiler and boiler casing, whereby reactor coolant from the said transverse duct passes through the reheater, in heat-exchanging relationship with steam passing therethrough, before entering the said annular duct.

4. A nuclear reactor as claimed in claim 3 and provided with a supporting spine extending axially in the cavity from the lower end thereof, the reheater being annular and surrounding the spine and being supported thereby and the boiler and its outlet duct, boiler casing and outer casing being also supported by the spine.

* * * * *